United States Patent
Richter et al.

(10) Patent No.: US 8,593,025 B2
(45) Date of Patent: Nov. 26, 2013

(54) DRIVING DEVICE, IN PARTICULAR ELECTRIC MOTOR, FOR DRIVING A UNIT

(75) Inventors: Frank Richter, Buehl (DE); Erwin Sinnl, Meimsheim (DE)

(73) Assignee: Robert Bosch GmbH, Stuttgart (DE)

( * ) Notice: Subject to any disclaimer, the term of this patent is extended or adjusted under 35 U.S.C. 154(b) by 233 days.

(21) Appl. No.: 13/024,828

(22) Filed: Feb. 10, 2011

(65) Prior Publication Data

US 2011/0193437 A1    Aug. 11, 2011

(30) Foreign Application Priority Data

Feb. 11, 2010   (DE) .......................... 10 2010 001 792

(51) Int. Cl.
- *H02K 5/16* (2006.01)
- *B61F 15/00* (2006.01)
- *F16C 33/02* (2006.01)
- *F04B 49/00* (2006.01)

(52) U.S. Cl.
USPC .............. 310/90; 384/158; 384/276; 417/216

(58) Field of Classification Search
USPC ............ 310/90; 384/563, 158, 276; 464/124, 464/128; 417/214, 216
See application file for complete search history.

(56) References Cited

U.S. PATENT DOCUMENTS

| | | | |
|---|---|---|---|
| 2,650,543 A * | 9/1953 | Pauget | 417/214 |
| 3,677,032 A * | 7/1972 | Suzuki | 464/128 |
| 5,102,239 A * | 4/1992 | Momose et al. | 384/276 |
| 6,886,717 B2 * | 5/2005 | Sanders | 222/333 |

FOREIGN PATENT DOCUMENTS

| | | |
|---|---|---|
| DE | 10140918 A1 * | 12/2002 |
| DE | 102005029446 A1 * | 12/2006 |
| WO | WO 2009104593 A1 * | 8/2009 |

OTHER PUBLICATIONS

Machine Translation DE10140918 (2002) and DE102005029446 (2006).*
Machine Translation WO2009104593.*

* cited by examiner

*Primary Examiner* — Tran Nguyen
*Assistant Examiner* — Jose Gonzalez Quinones
(74) *Attorney, Agent, or Firm* — Michael Best & Friedrich LLP

(57) ABSTRACT

A driving device (10) for driving a unit (11) is specified, with a drive shaft (16) on which a plurality of rolling bearings (19 to 21) serving to drive respective functional elements of the unit (11) are arranged next to one another. The rolling bearings (19 to 21) are designed as unencapsulated needle bearings (22 to 24) and are arranged directly next to one another on the drive shaft (16) in such a manner that the inner ring (25, 26) of a needle bearing (22, 23) is in touching contact by means of its end surface (43, 44), which is located on an axial side, with the facing, axial end surface (46, 47) of the outer sleeve (32, 33) of the needle bearing (23, 24) following next axially.

20 Claims, 2 Drawing Sheets

001
DRIVING DEVICE, IN PARTICULAR ELECTRIC MOTOR, FOR DRIVING A UNIT

BACKGROUND OF THE INVENTION

The invention is based on a driving device, in particular an electric motor, for driving a unit, in particular a pump.

In a known driving device of the type mentioned, two rolling bearings are arranged on the drive shaft, said rolling bearings being designed as encapsulated needle bearings and, owing to the encapsulated, self-locking form, do not require an additional run-on surface axially and can therefore be positioned in a freely selectable manner on the drive shaft by means of a press fit. A first disadvantage of this design is the high expenditure for encapsulated needle bearings. Secondly, the driving device has a relatively large axial construction length.

SUMMARY OF THE INVENTION

The driving device according to the invention has the advantage of considerably reducing costs owing to the use of unencapsulated needle bearings. By means of the arrangement of the unencapsulated needle bearings directly one behind another, said needle bearings running up against one another and therefore being connected to one another, the driving device has a small axial construction length which results in a reduced construction space in addition to the advantage in terms of costs.

DESCRIPTION OF THE DRAWINGS

The invention is explained in more detail in the description below with reference to an exemplary embodiment which is illustrated in the drawings, in which, in a schematic illustration in each case.

DETAILED DESCRIPTION

Figure 1:
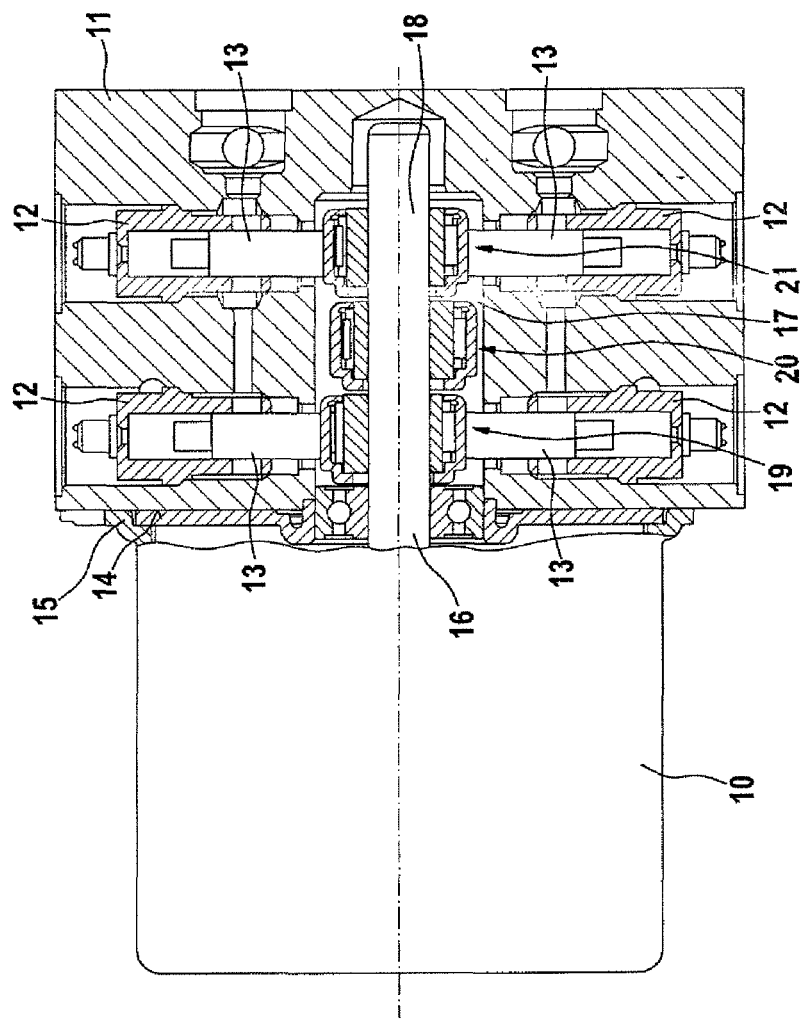
FIG. 1 shows a schematic, partially sectioned side view of a driving device with a unit driven thereby.
Figure 2:
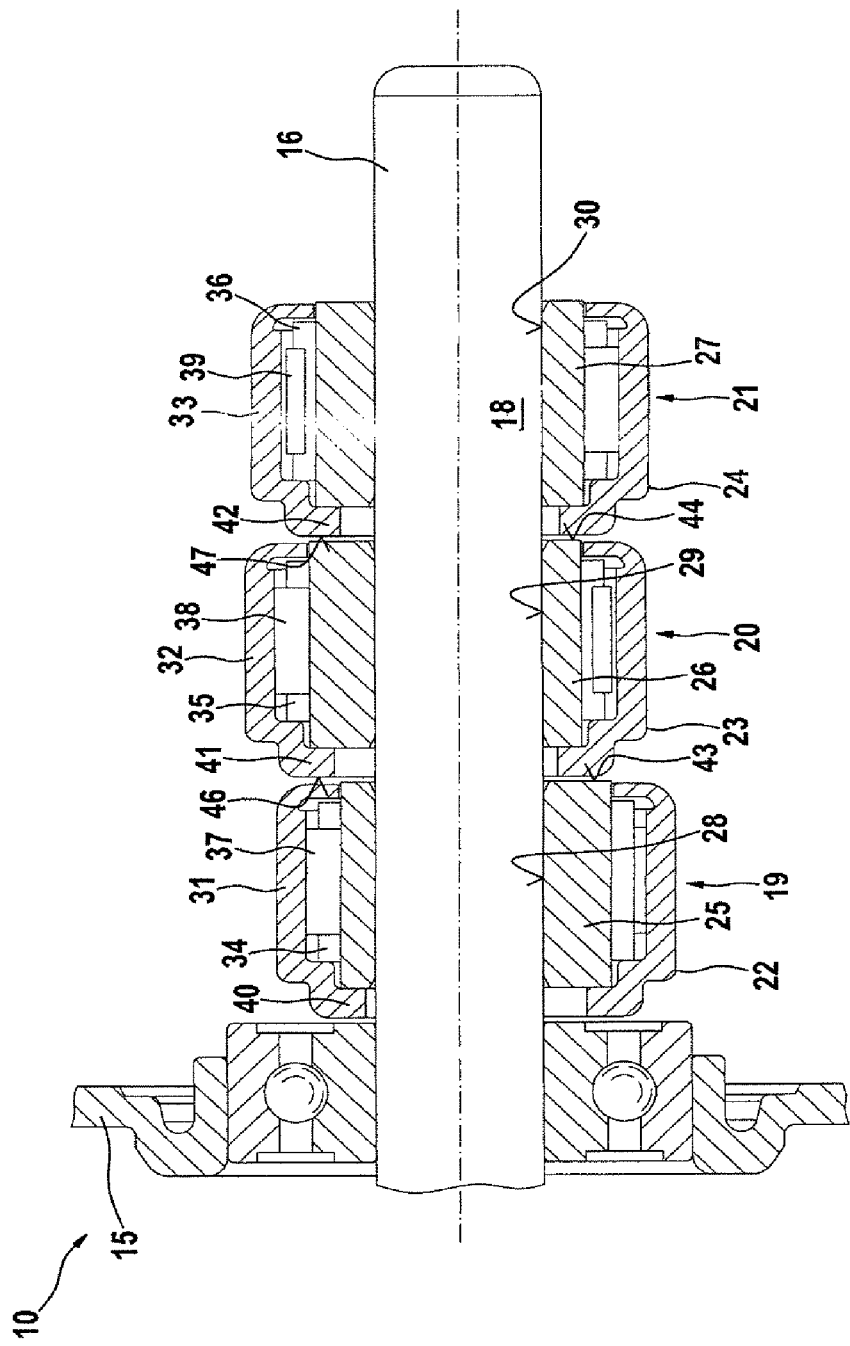
FIG. 2 shows a schematic section of a cutout from FIG. 1 on an enlarged scale.

The drawings schematically illustrate a driving device 10 for driving a unit 11, wherein the driving device 10 may be a motor, in particular an electric motor. The unit 11 consists, for example, of a pump with individual, radially arranged pump elements 12, of which the ends of respective rams 13 can be seen. The driving device 10 constitutes a separate component which is ready for installation, as does the unit 11. The two are fitted together, wherein the driving device 10 is flange-mounted on an end side 14 of the unit 11.

The driving device 10 has a drive shaft 16 which is guided out of the housing 15 of said driving device and can be driven so as to revolve in one direction when the driving device 10 is switched on. The drive shaft 16 protrudes into a central interior space 17 of the unit 11 and, on said shaft section 18, bears a plurality of rolling bearings 19, 20 and 21 which are arranged next to one another and serve to drive the individual rams 13 which constitute functional elements of the unit 11 and sit with the ends thereof radially on the outer circumferential surface of the rolling bearings 19, 20, 21. In the example embodiment shown, three rolling bearings 19 to 21 of the same type are mounted on the drive shaft 16. Said rolling bearings 19 to 21 are each designed as unencapsulated needle bearings 22, 23, 24 which are arranged directly next to one another in such a manner that said needle bearings run up against one another.

Each needle bearing 22 to 24 has an inner ring 25 to 27 with an eccentric inner bore 28 to 30 by which the inner ring 25 to 27 is held directly on the drive shaft 16 in a rotationally fixed manner, for example is pressed thereon. The individual inner rings 25 to 27 are placed at a different eccentricity in each case with respect to the drive shaft 16.

Furthermore, each rolling bearing 19 to 21 in the form of a respective needle bearing 22 to 24 has an outer sleeve 31 to 33 surrounding the inner ring 25 to 27 at a radial distance, and respective, needle-shaped bearing bodies 37 to 39, which are held in a cage 34 to 36, in the annular gap between the inner ring 25 to 27 and the outer sleeve 31 to 33. The respective outer sleeve 31 to 33 of each needle bearing 22 to 24 bears, on an axial side located on the left in the drawings, a flange 40 to 42 which engages axially over the assigned axial side of the respective inner ring 25 to 27 and can form an axial stop for the outer sleeve 31 to 33, even if there is a certain axial play between the flange 40 to 42 and the assigned end side of the inner ring 25 to 27. The inner ring 25 to 27 passes through that axial side of the outer sleeve 31 to 33 which faces the flange 40 to 42. At said end of the outer sleeve 31 to 33, which end is on the right in the drawings, the respective inner ring 25 to 27 is extended beyond the axial end there of the outer sleeve 31 to 33 such that the inner ring 25 to 27 has, on said axial side, an axial excess length in relation to the respective outer sleeve 31 to 33. On said axial side, axial end surface 43, 44 of the inner ring 25, and axial end surfaces 46, 47 on the flange 41, 42 of the outer sleeve 32, 33 face one another axially with a certain axial play, with the respective end surface 43, 44 of the respective inner ring 25, 26 forming a run-on surface for the outer sleeve 32, 33. The arrangement here is undertaken in such a manner that the inner ring 25, 26 is in touching contact with a degree of play by means of its end surface 43, 44, which is located on an axial side, with the facing axial end surface 46, 47 of the outer sleeve 32, 33 of the needle bearing 23, 24 following next axially. Owing to this design, the respective end surface 43, 44 of the respective inner ring 25, 26 obtains a special function as a run-on surface for the needle bearing 23, 24 following next axially. In order to ensure that the outer sleeve 32, 33 of the needle bearing 23, 24 following next axially reliably runs up against the inner ring 25, 26 mounted upstream axially, with all the tolerances being taken into consideration, wherein contact of outer sleeve with outer sleeve should be avoided, the respective inner ring 25 to 27 can be correspondingly extended, if the need arises, toward the flange 41, 42 in the one axial direction in order to ensure that the axial end surface 46, 47 of the flange 41, 42 is in touching contact with the axially adjacent end surface 43, 44 of one side of the inner ring 25, 26.

In the event of high axial forces which act on the end surface 43, 44 of the inner ring 25, 26 because of the outer sleeve 32, 33 of the needle bearing 23, 24 following next running up against said end surface, provision is advantageously made for the end surface 43, 44 on one axial side of the respective inner ring 25, 26 and/or for the facing end surface 46, 47 of the adjacent axial side of the outer sleeve 32, 33 to be provided with wearing protection. Said wearing protection can consist of a hardening, a hardening coating or the like, for example also of an applied ceramic layer.

It can be seen that, in the arrangement according to the invention, a plurality of needle bearings 22 to 24 in an unencapsulated construction are placed directly one behind another on the drive shaft 16. The arrangement of unencapsulated needle bearings 22 to 24 as compared to encapsulated needle bearings which are otherwise known results in a large advantage in terms of costs of the order to magnitude of, for example, 20% to 30%. By means of the particular design of a plurality of needle bearings 22 to 24, directly one behind another, the needle bearings running up against one another and therefore being functionally connected to one another, a small axial construction length is produced for that shaft section 18 of the drive shaft 16 which is located within the unit 11, with an associated advantage in terms of costs and a reduced construction space achieved.

Owing to the respective eccentric inner bore 28 to 30 of each inner ring 25 to 27, as the drive shaft 16 revolves a lifting drive of the individual tappets 13, the end sides of which sit on the outer surface of the respective outer sleeve 31 to 33, takes place in the radial direction. In another exemplary embodiment (not shown), the respective inner bore 28 to 30 of each inner ring 25 to 27 is formed centrally. The eccentric drive of the unit 11 is then produced, for example, by means of an eccentric shaft.

The invention claimed is:

1. A driving device for driving a unit (11), the driving device comprising:
a drive shaft (16), on which at least three rolling bearings (19 to 21) that drive respective functional elements of the unit are arranged next to one another,
characterized in that the at least three rolling bearings (19 to 21) are unencapsulated needle bearings (22 to 24) and are arranged directly next to one another on the drive shaft (16) such that an axial end surface (43, 44) of an inner ring (25, 26) within the needle bearing (22, 23) contacts an axial end surface (46, 47) of an outer sleeve (32, 33) of an axially adjacent needle bearing (23, 24) or there is axial play between the mutually adjacent end surfaces (43, 46 and 44, 47) of the needle bearings (23, 24), wherein the inner ring (25 to 27) of each needle bearing (22 to 24) has an eccentric inner bore (28 to 30) by which the inner ring (25 to 27) is pressed onto the drive shaft (16), and wherein the eccentric inner bores of the inner rings (25 to 27) are shifted with respect to a circumferential surface of the inner ring to drive individual tappets.

2. A driving device according to claim 1, characterized in that the inner ring (25 to 27) of each needle bearing (22 to 24) has, on an axial side, an axial excess length in relation to the respective outer sleeve (31 to 33).

3. A driving device according to claim 2, characterized in that the inner ring (25 to 27) of each needle bearing (22 to 24) is extended on an axial side beyond an axial end of the associated outer sleeve (31 to 33).

4. A driving device according to claim 1, characterized in that the end surface (43, 44) on an axial side of the respective inner ring (25, 26) forms a run-on surface for the outer sleeve (32, 33) of the axially adjacent needle bearing (23, 24).

5. A driving device according to claim 1, characterized in that there is axial play between the mutually adjacent end surfaces (43, 46 and 44, 47) of the needle bearings (23, 24).

6. A driving device according to claim 1, characterized in that the end surface (43, 44) on an axial side of the respective inner ring (25, 26) and/or the facing end surface (46, 47) of the adjacent axial side of the outer sleeve (32, 33) of each needle bearing (22 to 24) are/is provided with wearing protection.

7. A driving device according to claim 6, characterized in that the wearing protection includes a hardening material or a hardening coating.

8. A driving device according to claim 1, characterized in that each needle bearing (22 to 24) has an outer sleeve (31 to 33) which, on one axial side, bears a flange (40 to 42) engaging axially over the inner ring (25 to 27), and the inner ring (25 to 27) passes through an opposite axial side of said outer sleeve.

9. A driving device according to claim 8, characterized in that the axial end surface (46, 47) of the flange contacts the axially adjacent end surface (43, 44) of one side of the inner ring (25, 26).

10. An electric motor for driving a pump, the electric motor comprising:
a drive shaft (16), on which at least three rolling bearings (19 to 21) that drive respective functional elements of the unit are arranged next to one another,
characterized in that the at least three rolling bearings (19 to 21) are unencapsulated needle bearings (22 to 24) and are arranged directly next to one another on the drive shaft (16) such that an axial end surface (43, 44) of an inner ring (25, 26) within the needle bearing (22, 23) contacts an axial end surface (46, 47) of an outer sleeve (32, 33) of an axially adjacent needle bearing (23, 24) or there is axial play between the mutually adjacent end surfaces (43, 46 and 44, 47) of the needle bearings (23, 24), wherein the inner ring (25 to 27) of each needle bearing (22 to 24) has an eccentric inner bore (28 to 30) by which the inner ring (25 to 27) is pressed onto the drive shaft (16), and wherein the eccentric inner bores of the inner rings (25 to 27) are shifted with respect to a circumferential surface of the inner ring to drive individual tappets.

11. An electric motor according to claim 10, characterized in that the inner ring (25 to 27) of each needle bearing (22 to 24) has, on an axial side, an axial excess length in relation to the respective outer sleeve (31 to 33).

12. An electric motor according to claim 11, characterized in that the inner ring (25 to 27) of each needle bearing (22 to 24) is extended on an axial side beyond an axial end of the associated outer sleeve (31 to 33).

13. An electric motor according to claim 10, characterized in that the end surface (43, 44) on an axial side of the respective inner ring (25, 26) forms a run-on surface for the outer sleeve (32, 33) of the axially adjacent needle bearing (23, 24).

14. An electric motor according to claim 10, characterized in that there is axial play between the mutually adjacent end surfaces (43, 46 and 44, 47) of the needle bearings (23, 24).

15. An electric motor according to claim 10, characterized in that the end surface (43, 44) on an axial side of the respective inner ring (25, 26) and/or the facing end surface (46, 47) of the adjacent axial side of the outer sleeve (32, 33) of each needle bearing (22 to 24) are/is provided with wearing protection.

16. An electric motor according to claim 15, characterized in that the wearing protection includes a hardening material or a hardening coating.

17. An electric motor according to claim 10, characterized in that each needle bearing (22 to 24) has an outer sleeve (31 to 33) which, on one axial side, bears a flange (40 to 42) engaging axially over the inner ring (25 to 27), and the inner ring (25 to 27) passes through an opposite axial side of said outer sleeve.

18. An electric motor according to claim 17, characterized in that the axial end surface (46, 47) of the flange contacts the axially adjacent end surface (43, 44) of one side of the inner ring (25, 26).

19. An electric motor according to claim 10, characterized in that the inner ring (25 to 27) of each needle bearing (22 to 24) has an eccentric inner bore (28 to 30) by which the inner ring (25 to 27) is pressed onto the drive shaft (16).

20. A driving device according to claim 1, characterized in that the functional elements are pump elements extending radially from the shaft.

* * * * *